(12) United States Patent
Cruciani et al.

(10) Patent No.: US 10,769,117 B2
(45) Date of Patent: Sep. 8, 2020

(54) EFFECTIVE HANDLING OF HSM MIGRATED FILES AND SNAPSHOTS

(71) Applicant: INTERNATIONAL BUSINESS MACHINES CORPORATION, Armonk, NY (US)

(72) Inventors: Mauro Cruciani, Mainz (DE); Christian Mueller, Dichtelbach (DE); Dominic Mueller-Wicke, Weilburg (DE); Eirini Petraki, Mainz (DE); Sabine U. Steinhauer, Ingelheim (DE)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 15/874,240

(22) Filed: Jan. 18, 2018

(65) Prior Publication Data

US 2019/0220528 A1 Jul. 18, 2019

(51) Int. Cl.

| | |
|---|---|
| *G06F 16/185* | (2019.01) |
| *G06F 16/174* | (2019.01) |
| *G06F 16/11* | (2019.01) |
| *G06F 16/16* | (2019.01) |
| *G06F 16/172* | (2019.01) |
| *G06F 3/06* | (2006.01) |
| *G06F 11/14* | (2006.01) |

(52) U.S. Cl.
CPC .......... *G06F 16/185* (2019.01); *G06F 3/0685* (2013.01); *G06F 16/174* (2019.01); *G06F 3/0605* (2013.01); *G06F 3/0649* (2013.01); *G06F 11/1464* (2013.01); *G06F 16/119* (2019.01); *G06F 16/162* (2019.01); *G06F 16/172* (2019.01); *G06F 2201/84* (2013.01)

(58) Field of Classification Search
CPC .. G06F 16/185; G06F 16/119; G06F 16/1744; G06F 2201/84; G06F 16/162; G06F 16/172
USPC ......................................... 707/644, 737, 692
See application file for complete search history.

(56) References Cited

U.S. PATENT DOCUMENTS

| | | | |
|---|---|---|---|
| 6,269,382 | B1 | 7/2001 | Cabrera et al. |
| 8,055,864 | B2 | 11/2011 | Sawdon et al. |
| 9,342,537 | B2 * | 5/2016 | Kumarasamy .......... G06F 11/14 |

(Continued)

FOREIGN PATENT DOCUMENTS

WO 2009019128 A1 2/2009

OTHER PUBLICATIONS

Sun Microsystems, "Hierarchical Storage Management," Solstice Backup 5.0.1 Administration Guide, Chapter 8, Copyright 1997 (Best Date Available) Sun Microsystems, Inc., http://www.mathematik.uni-kassel.de/Manuals/sb/SOLBCKUPADMIN/ch08.html, pp. 1-6.

*Primary Examiner* — Dangelino N Gortayo
(74) *Attorney, Agent, or Firm* — Samuel A. Waldbaum

(57) ABSTRACT

A method for handling snapshots together with migrated files in a hierarchical storage management may be provided. The method comprises managing files using a first-tier storage and a second-tier storage. The files are organized in a managed file system—e.g., a hierarchically managed file system—in the first-tier storage. The method comprises further creating a snapshot of a portion of the files of the first-tier storage, thereby creating a hidden directory in the file system, deleting a migrated file, and moving the stub file relating to the file to be deleted in the first-tier storage to the hidden directory.

19 Claims, 7 Drawing Sheets

(56) References Cited

U.S. PATENT DOCUMENTS

| | | | |
|---|---|---|---|
| 9,946,729 B1* | 4/2018 | Stacey | G06F 16/185 |
| 2009/0150461 A1* | 6/2009 | McClanahan | G06F 16/184 |
| 2009/0150477 A1* | 6/2009 | McClanahan | G06F 16/1744 |
| | | | 709/203 |
| 2013/0191350 A1* | 7/2013 | Esaka | H04L 67/1097 |
| | | | 707/692 |
| 2014/0101158 A1 | 4/2014 | Kraemer et al. | |
| 2014/0181033 A1* | 6/2014 | Pawar | G06F 11/1474 |
| | | | 707/644 |
| 2018/0189124 A1* | 7/2018 | Bhagwat | G06F 16/188 |

* cited by examiner

100

| 102 | managing files using a 1st and a 2nd storage tier |

| 104 | creating a snapshot of a portion of the files of the first storage tier |

| 106 | creating a hidden directory |

| 108 | deleting a migrated file in the first storage tier |

| 110 | moving a stub file relating to the file to be deleted in the first storage tier to the hidden directory |

EFFECTIVE HANDLING OF HSM MIGRATED FILES AND SNAPSHOTS

BACKGROUND

The invention relates generally to a method for handling snapshots together with migrated files in a managed storage management, and more specifically, handling snapshots together with migrated files in a managed storage. The invention relates further to a related system for handling snapshots together with migrated files in a storage management system, and a computer program product.

Enterprise IT (information technology) management continues to struggle with the management of vast amounts of data. The problem has been addressed by classifying the data with respect to their availability for access in different time categories. Instantly required data may be stored in the main memory of a computer system, data required in milliseconds may be stored on disk storage systems and data not required immediately may be swapped out to, e.g., tape storage systems or other longer-term storage systems. Storage systems having such tiered storage architecture—e.g., disk system as a first-tier storage (also tier-1 storage) and a long-term storage as a second-tier storage (also tier-2 storage)—may be denoted as hierarchical storage management (HSM) systems. Such HSM may represent a compromise between the data access time and the cost of storing large amounts of slowly changing or less critical data.

On the other side, snapshots may be generated from active systems, i.e., from data being stored in the first-tier storage. Typically, such multi-tier storage environments may be accessed using a standardized access method like DMAPI (data management application user interface). However, there exist incompatibilities between HSM functions and snapshots of the life data, i.e., data in the first-tier storage.

For a user, it may be completely transparent in an HSM system were a file may be stored—the first-tier storage or the second-tier storage. Typically, a stub file may be created in the file system if the original file is moved from the active storage system—i.e., from the first-tier storage—to the second-tier storage. For the user, a stub file cannot be distinguished from the original file because all metadata are shown—e.g., in a file explorer—as if it would be the original file, e.g., the file size. The file size may be shown as, e.g., 10 MB for a video file, although the related stub file may only require a couple of hundred bytes.

For traditional HSM managed storage systems the conflict between the migrated files and snapshot become visible: If the user wants to free space in the first-tier storage, he may delete one or more files in the first-tier storage. However, if the file was an HSM migrated file—i.e., only the stub file exists in the active, first-tier storage—the user may only delete a couple of hundred bytes. But at the same time, the original file with a couple of MBs needs to be brought back from the second-tier storage to the snapshot. Thus, the problem turns out to be: if the user deletes a file that is part of a snapshot, in the first-tier storage, the original file is brought back from the second-tier storage if there is at least one snapshot of the file. This may increase the amount of storage required for storing data in the first-tier storage. Hence, the opposite of the objective—reducing the amount of data stored in the first-tier storage—is achieved without intention. This may represent the conflict between HSM migrated files and snapshots.

SUMMARY

According to one aspect of the present invention, a method for handling snapshots together with migrated files in a hierarchical storage management system may be provided. The method may comprise managing files using a first-tier storage and a second-tier storage. The files may be organized in a file system in the first-tier storage, wherein the file system is a managed file system.

The method may further comprise creating a snapshot of a portion of the files of the first-tier storage, and thereby creating a hidden directory in the file system, deleting a file, wherein the file is a migrated file, and moving the stub file that is related to the file to be deleted in the first-tier storage to the hidden directory.

According to another aspect of the present invention, a system for handling snapshots together with migrated files in a hierarchical storage management system may be provided. The system may comprise a first-tier storage and a second-tier storage adapted for managing files. The files may be organized in a file system in the first-tier storage, wherein the file system is a managed file system.

The system may additionally comprise a snapshot unit adapted for creating a snapshot of a portion of the files of the first-tier storage, and thereby creating a hidden directory in the file system, a deletion module adapted for deleting a file in the first-tier storage, wherein the file is a migrated file, and a movement unit adapted for moving the stub file relating to the file to be deleted in the first-tier storage to the hidden directory.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Figure 1:
Figure 1:
Figure 1:
Figure 1:
Figure 1:

Preferred embodiments of the invention will be described, by way of example only, and with reference to the following drawings:

FIG. 1 shows a block diagram of an embodiment of the inventive method for handling snapshots together with migrated files in a hierarchical storage management.

Figure 2:
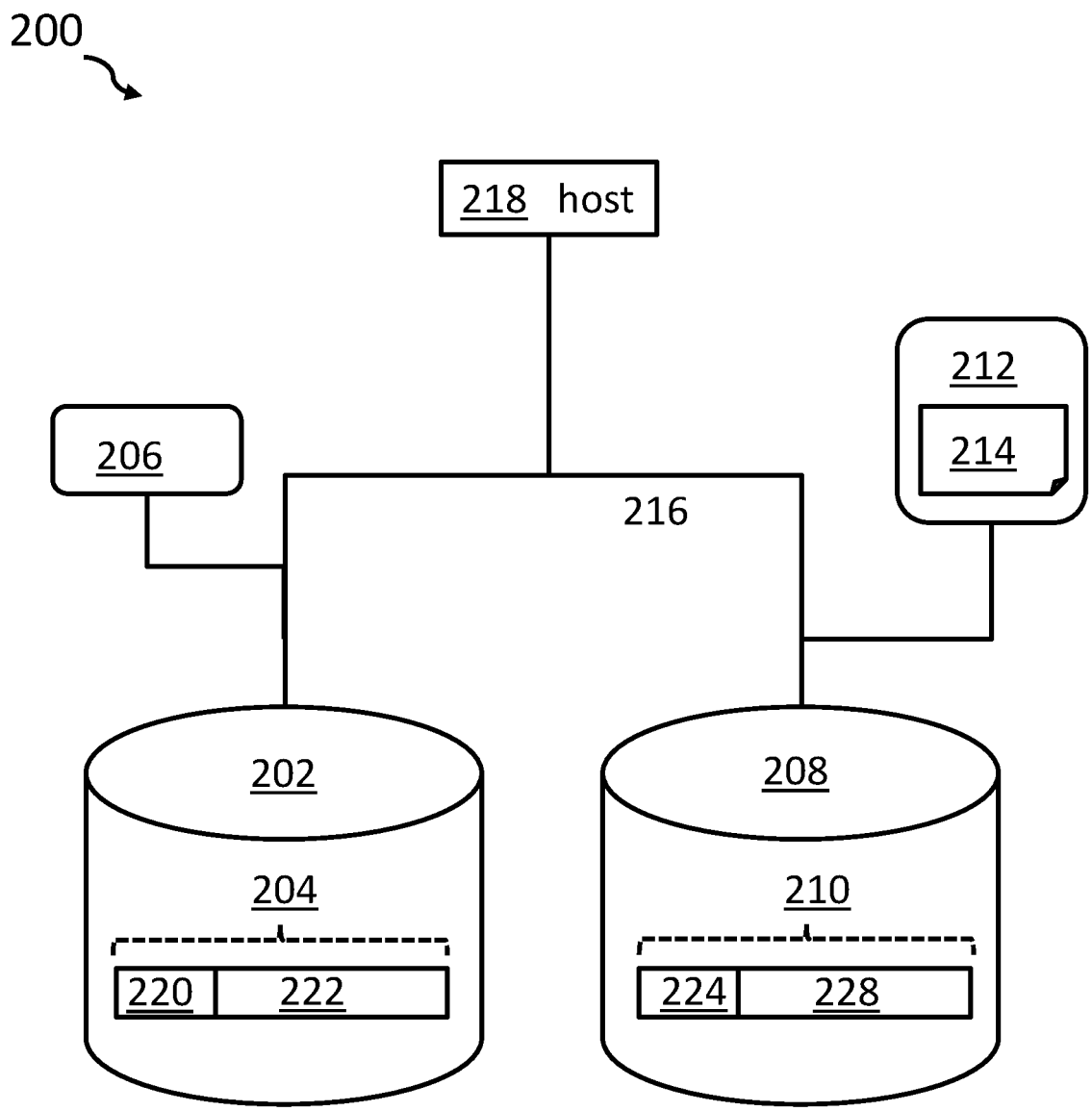

FIG. 2 shows a block diagram of a traditional two-tier HSM system.

Figure 3:
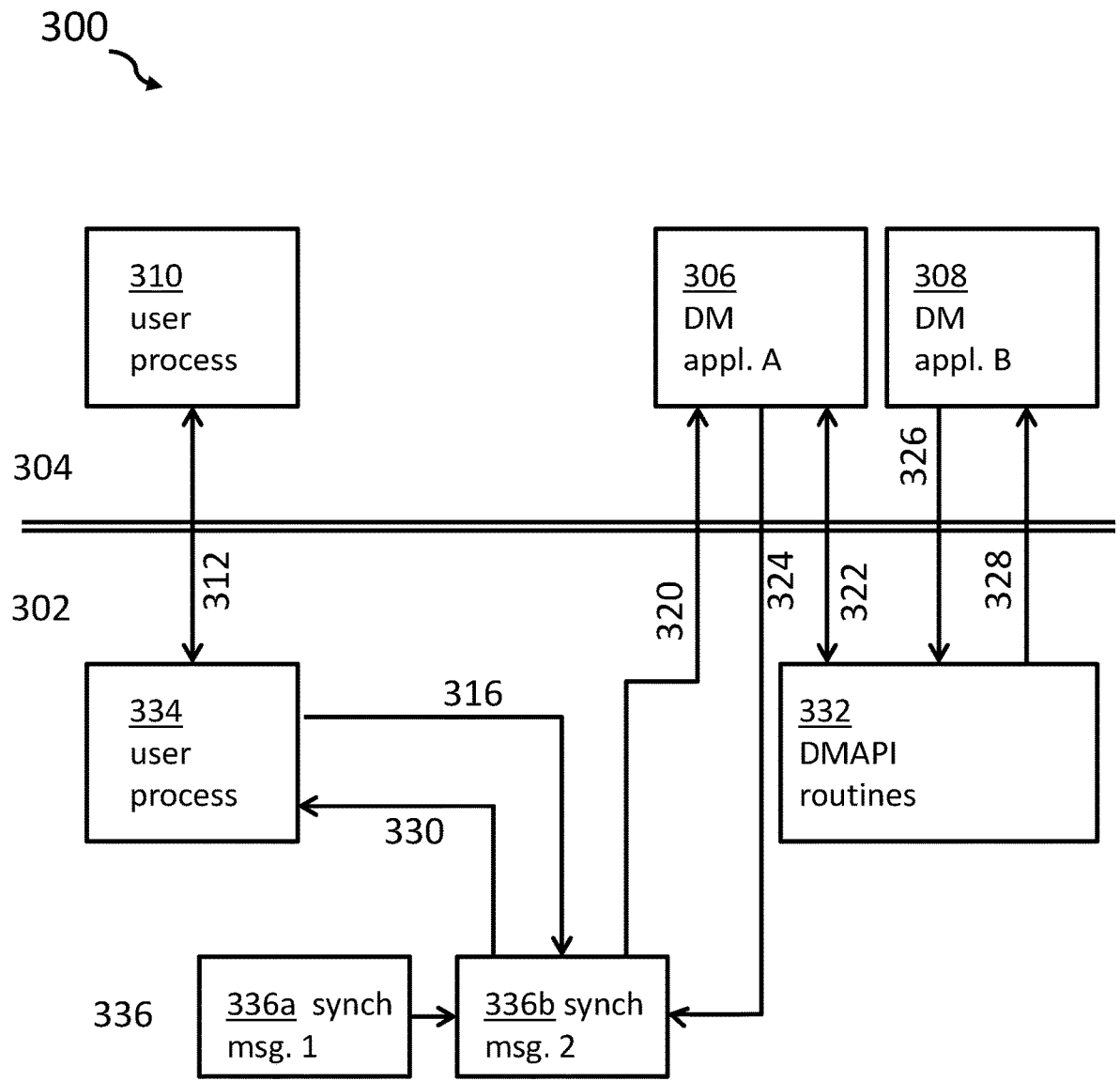

FIG. 3 shows a block diagram of the known data management application programmable interface.

Figure 4:
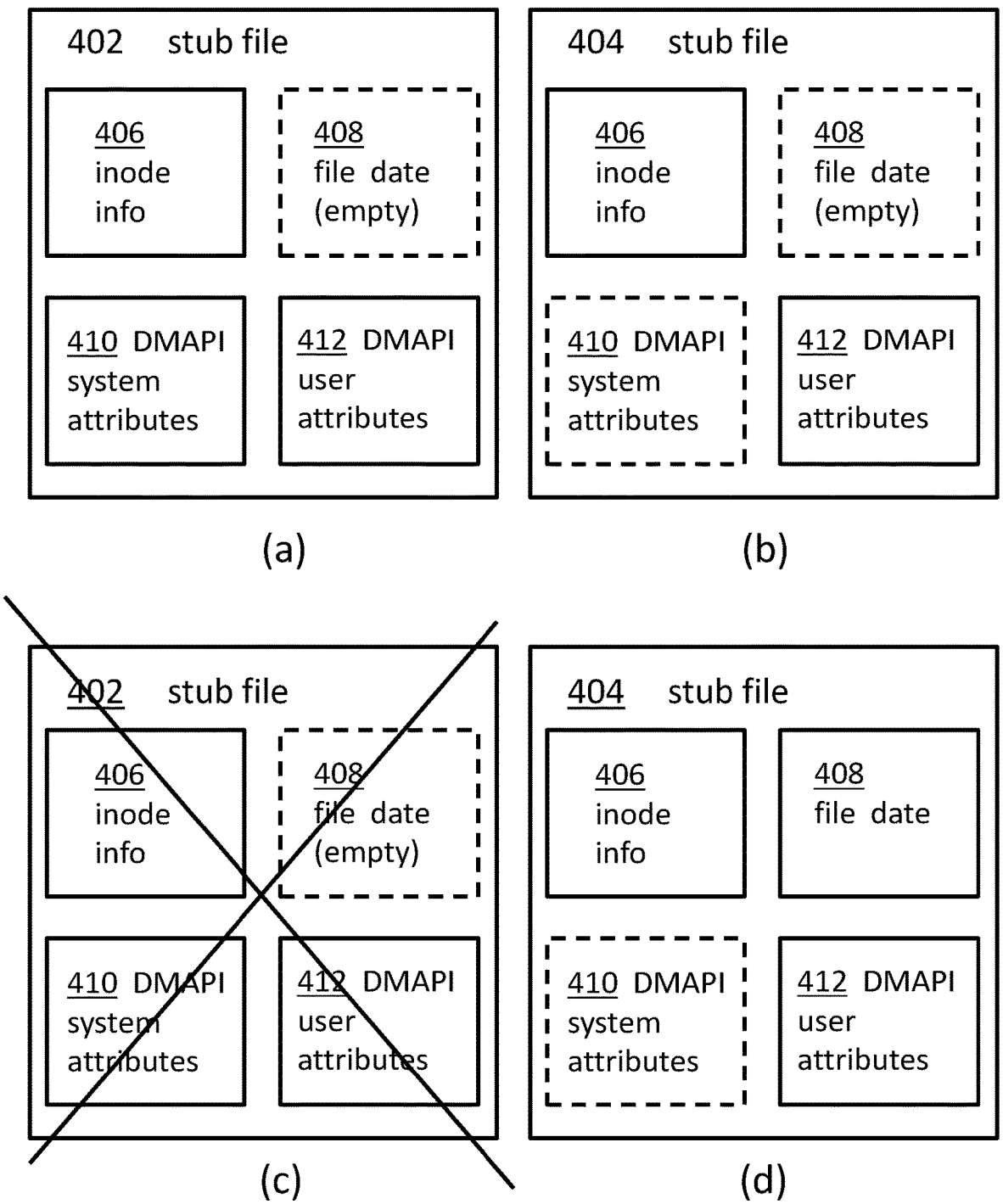

FIG. 4 shows a block diagram of a comparison of a stub file and a original file system and a stub file in a snapshot.

Figure 5:
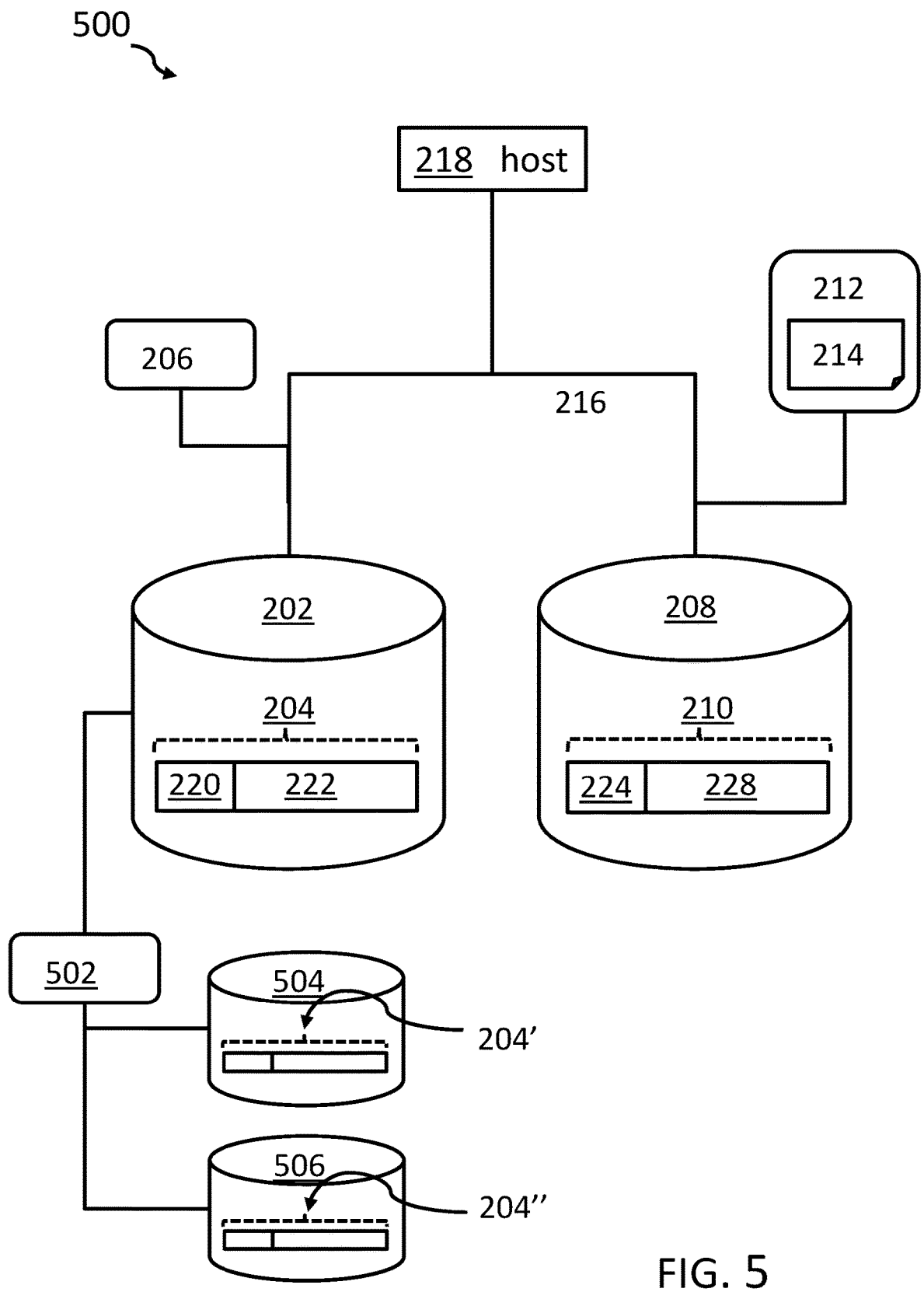

FIG. 5 shows a block diagram of the extended HSM system in the context of the known HSM system from FIG. 2.

Figure 6:
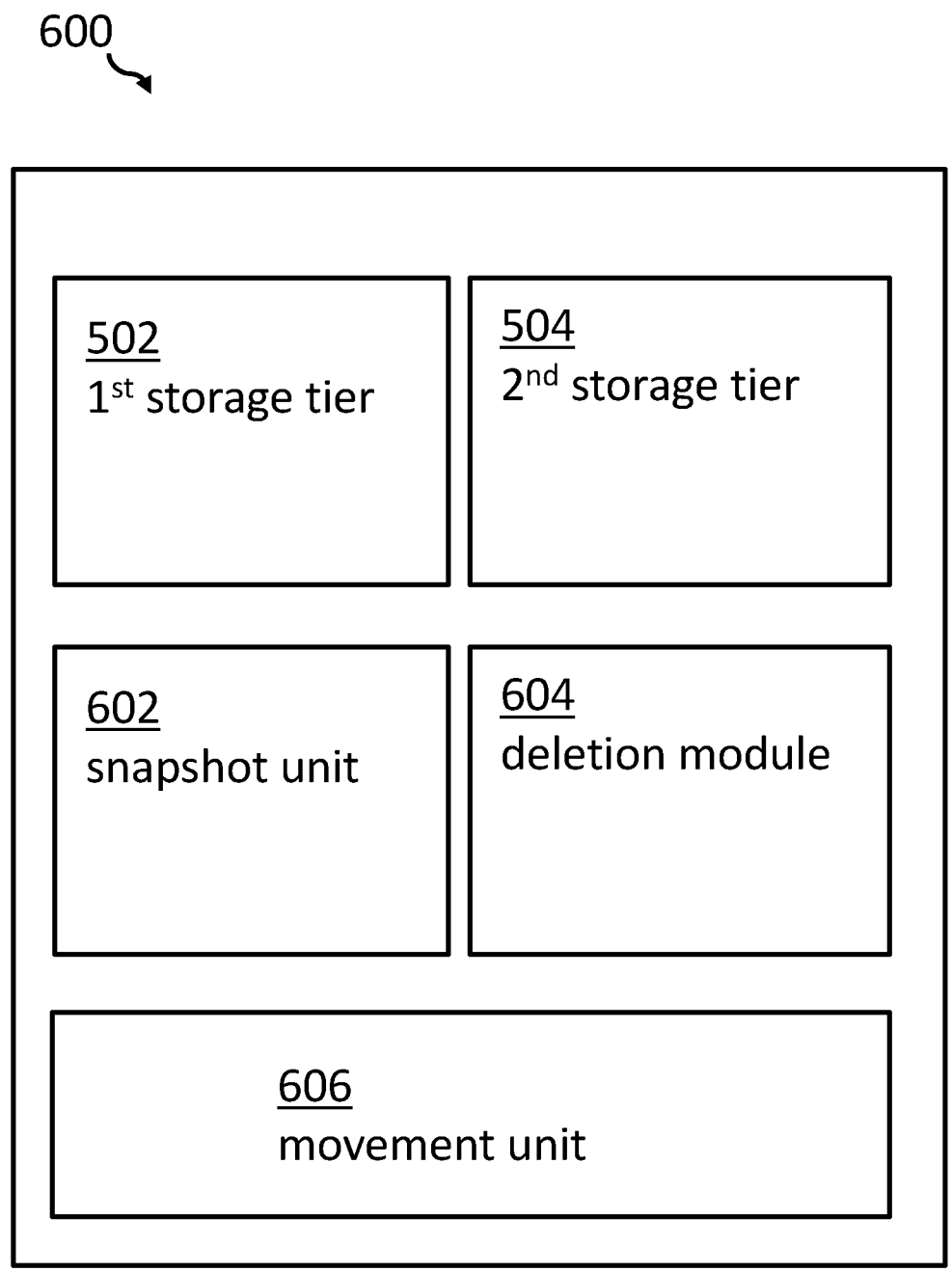

FIG. 6 shows a block diagram of the system for handling snapshots together with migrated files in a hierarchical storage management.

Figure 7:
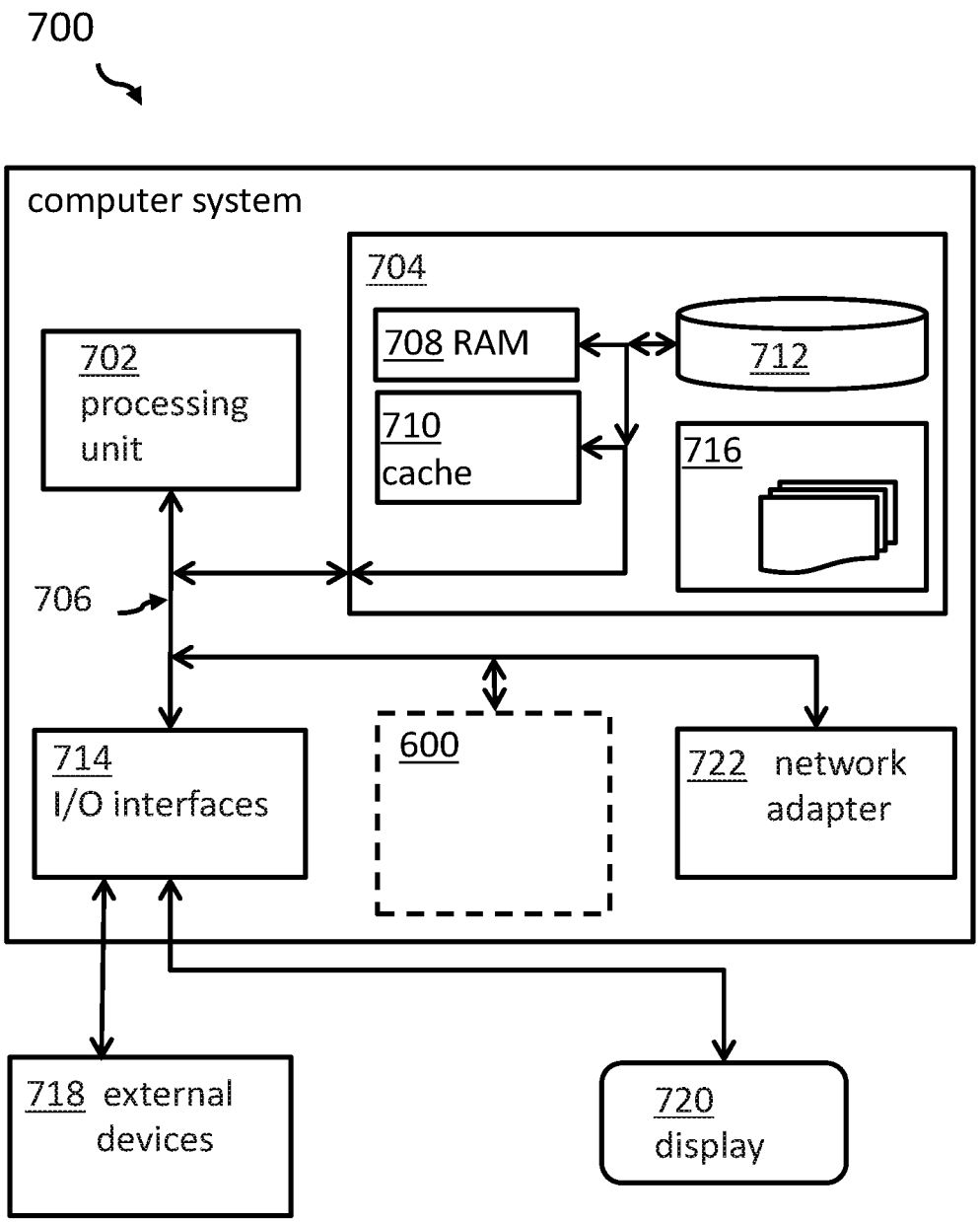

FIG. 7 shows an embodiment of a computing system comprising the system for handling snapshots according to FIG. 6.

DETAILED DESCRIPTION

In the context of this description, the following conventions, terms and/or expressions may be used:

The term 'snapshots' may denote a logical point-in-time copy of data, whereby the data is not copied directly, but a link to the original data (life data) is created in the snapshot. If the life data may be modified, a copy of the old version of the life data may be stored in the snapshot by a copy-on-write process. If a reference is made to a snapshot in this document, it should be understood that a software snapshot is meant which is based on software mechanisms (program code), and which is typically processed inside a single file system or inside a hypervisor in case of a virtualized computing environment. In contrast, the snapshot may be based on a hardware mechanism—e.g., a disk sub-system function—and may be processed inside the disk sub-system, whereby the disk sub-system may have a group of primary disks for the life data and a secondary group of disks for the snapshot data.

The term 'migrated file' may denote files of a managed file system—in particular, a hierarchically hierarchical file system which may no longer be stored in the first-tier of the hierarchically managed file system but which may have been moved to a second-tier storage. One reason may be that the data in the migrated file are so-called slow-moving or slow changing data which are more or less only read from the storage system and very seldom be changed.

The term 'hierarchical storage management' may denote a data management system comprising at least a first-tier storage and a second-tier storage. Typically, a data access in the first-tier storage may be much faster than data access on the second-tier storage. Typically, the first-tier storage may be a disk storage system—or alternatively solid-state RAM or other storage systems with short access times—whereas e.g., tape systems may be used for the second-tier storage, which have, by nature, a longer data access time.

The term 'first-tier storage' may denote the first data access layer in the sense of a hierarchical storage management system. Consequently, the term 'second-tier storage' may denote the slower but typically cheaper second data access layer in the sense of the hierarchical storage management system.

The term 'file system' may be used to control how data is stored and retrieved. Without a file system, information placed in a storage medium would be one large body of data with no way to tell where one piece of information stops and the next begins. By separating the data into pieces and giving each piece a name, the information is easily isolated and identified. Taking its name from the way, paper-based information systems are named, each group of data is called a "file". The structure and logic rules used to manage the groups of information and their names are called a "file system".

The term 'hidden directory' may denote a directory in a hierarchically organized file system which may not be visible to a user but only to specific operating system near processes. Thus, a file may be hidden if it is linked to the hidden directory.

The term 'metadata' may denote data or information about other data. One may differentiate between descriptive metadata, structural metadata and administrative metadata. In the context of this document most of the time reference is made to administrative metadata.

The proposed method for handling snapshots together with migrated files in a hierarchical storage management may offer multiple advantages and technical effects:

Basically, the proposed method and the related system solve the incompatibilities between HSM functionality and DMAPI controlled hierarchical file systems in a combination with snapshots. In particular, the traditional problem that a deletion of a migrated file, which is only represented in the life file system—i.e., stored in the first-tier storage—by a stub file, will create a "revitalization" of the complete content of the migrated file in the life file system in order to give a reference to a stub file in the snapshot to the content. Traditionally, this has increased the amount of data stored in the life file system if the migrated file was deleted and in the life file system.

Introducing the hidden directory may eliminate this problem and make snapshots and HSM migrated files compatible to each other without the requirement to reload the HSM content back into the life file system. Additionally, not any orphan stub file remains.

A user does not negatively influence the data amount in the life file system by deleting—unknowingly—only a stub file of a migrated file. Consequently, available resources—in particular storage resources—are managed more consistently and questions to an IT help desk may significantly be reduced because users may no longer worry about an unexplainable growth of the life data after a deletion of a migrated file.

In the following, additional embodiments of the proposed method—also applicable to the related system—will be described.

According to one preferred embodiment, the method may also comprise—in particular for a deleting a file in a file system—determining a creation time (in technical terms "ctime") of the migrated file to be deleted and determining snapshot versions—in particular all snapshot versions—in which the migrated file to be deleted is part of. And more precisely, determining the determining snapshot versions in which a link to the stub file in the first-tier is part of, i.e., those snapshots, which have a time later than the ctime.— Because the file to be deleted is a migrated file, only a stub file is present in the first-tier storage.

According to an advantageous embodiment, the method may also comprise—in particular for the case of a deletion of a file in the file system—adding metadata to the moved stub file in the hidden folder, wherein the metadata may be indicative of the determined snapshots. Thus, a clear link between a stub file moved to the hidden folder and the related snapshots may be available.

According to one allowable embodiment, the method may also comprise—in case of a removal of a snapshot—deleting a snapshot by determining stub files in the hidden directory, wherein the stub files relate to the snapshot to be deleted. And, upon the snapshot not being the last one—in particular on a time scale—deleting the related metadata. This may be repeated for all associated snapshots. Finally, the snapshot may be deleted.

According to a further advantageous embodiment of the method, the deletion of a snapshot may also comprise, upon the snapshot being the last one—also here: on a time scale—deleting the related stub file in the hidden folder. This way, all data structures belonging to a file, may be eliminated.

According to one useful embodiment of the method, the creation of the hidden directory may only be performed for a first snapshot to be created. All subsequent snapshots may use the same hidden directory. This way, the proposed method operates with as little overhead ss possible. Additional hidden directories may only make the proposed method more complex without additional benefits.

According to one optional embodiment of the method, the managed file system may be an encrypted hierarchical file system, i.e., a file system with the feature "file system encryption" enabled. Additionally and/or alternatively also other features of the file system may be enabled, e.g., "file system compression" and/or "file system deduplication". Basically, there should be no further limitations to the file system, as long as it is a managed file system, e.g., a hierarchically file system.

According to one preferred embodiment of the method, the management of the files may be based on the data management application programming interface (DMAPI of the Open Software Foundation, Open Group, respectively). Hence, the largest part of available file systems in the industry may be addressable by the proposed method and related system.

According to one additionally advantageous embodiment of the method, the managed file system is selected out of the group comprising XFS (a high-performance 64-bit journaling file system created by Silicon Graphics, Inc.), IBM JFS2 (Journaled File System or JFS is a 64-bit journaling file system created by IBM Inc.), VxFS (or Veritas File System from HP Inc.), StorNext (also SNFS, a shared disk file system made by Quantum Corporation Inc.), GPFS (General Parallel File System (GPFS) is a high-performance clustered file system developed by IBM). Generally, other file systems are not excluded. The file systems named here may represent a majority of those file systems being used currently. All trademarks and brand names used herein are properties of their respective owners.

According to another preferred embodiment of the method, the snapshot may be a software snapshot. The software snapshot may be seen in contrast to a hardware snapshot. The software snapshot may be based on software mechanisms (code) and may typically be processed inside a single file system or inside a hypervisor of a virtualized environment. In contrast, a hardware snapshot may be based on a disk subsystem function, as already defined above.

In the following, a detailed description of the figures will be given. All instructions in the figures are schematic. Firstly, a block diagram of an embodiment of the inventive method for handling snapshots together with migrated files in a hierarchical storage management is given. Afterwards, further embodiments, as well as embodiments of the method for handling snapshots together with migrated files in a hierarchical storage management, will be described.

FIG. 1 shows a block diagram of an embodiment of the method 100 for handling snapshots—in particular software snapshots—together with migrated files in a hierarchical storage management. The method comprises managing, 102 files using a first-tier storage and a second-tier storage—e.g., block device tape—wherein the files are organized in a managed file system in the first-tier storage. The managed file system can, e.g., be a hierarchically managed file system. The method 100 comprises further creating, 104 a snapshot of a portion of the files of the first-tier storage, thereby creating a hidden directory. It may be noted that for migrated files only links to the stub files in the first-tier are snapshots.

The hidden directory is only created, 106, for the first snapshot. All subsequent snapshots will use the same hidden directory. It may also be noted that the hidden directory may be empty initially. It may only come to life if a deletion happens for a file which has also be captured in a snapshot. Alternatively, the hidden directory may—in particular for the first deletion—also be created at deletion time.

The method 100 comprises additionally deleting, 108, a file—actually the stub file because the file is a migrated file—in the first-tier storage. The deletion may be initiated by a user or another process. As mentioned, the file is a migrated file, in particular migrated to the second-tier storage.

Furthermore, the method 100 comprises moving, 110,—in particular moving before—the stub file relating to the file to be deleted in the first-tier storage to the hidden directory. Thereby, content deletion in the visible file system is finalized.

In order to get a more comprehensive understanding of the here proposed techniques, it may be useful to have a closer look to traditional HSM handling. FIG. 2 shows a block diagram of a traditional two-tier HSM system. In general, HSM (Hierarchical Storage Management) is a technique that allows storing data on the most appropriate storage medium over the lifecycle of the data. HSM is typically implemented on a storage system that includes at least two tiers of storage. A first-tier storage may be provided by hard disk drives and a second-tier storage may be provided by tape systems. Data are firstly placed and stored on the first-tier storage (such as a disk) and later migrated to the second-tier storage (such as a tape). Thereby, the access to the data migrated to the second-tier storage is transparent via the first-tier. HSM can be implemented on the file systems, whereby the data subject for migration is a file or a directory. HSM can also be implemented on blocks storage systems, whereby the data subject for migration is a storage block (typically of fixed length). Thus, data may be a file, an object or a block of data.

The HSM system 200 in FIG. 2 comprises a first-tier storage 202 that stores data 204 to the first-tier storage 202 as an HSM client 206. The complete HSM system 200 comprises also a second-tier storage 208 that stores a copy 210 of the data 204. Coupled to the second-tier storage 208 is an HSM server 212. The HSM server 212 includes a data structure 214, by which the HSM server 212 tracks data identifiers, object IDs (identifiers) and storage locations for the data 210 stored in the second-tier storage 208. A network 216 connects all components. The network 216 may be one network but it may also be a plurality of (partial) networks connected to each other.

The host 218 is connected to the first-tier storage 202. The host computer system 218 reads and writes data 204 from/to the first-tier storage 202. The data 204 are identified by the host system 218 with a unique data identifier. In case of the first-tier storage 202 being a file storage system, the data identifier is the path and the file name. In case the first-tier storage 202 is a block storage system, the data identifier is a block address. The identifier is typically unique within the first-tier storage system 202.

The data 204, 210 comprise metadata 220, 224 and content 222, 226. The data 220 of the data 204 may include access control lists (ACL), attributes and extended attributes further describing the data 204. The same applies to the data 210 and the second-tier storage 208. The data 204 stored in the first-tier storage 202 has an HSM status stored in the metadata 220 and more particular in one of the extended attributes. The HSM status is maintained by the HSM client 206. The HSM status can be one of the following:

(a) resident: if the current version of the data 204 has not been migrated to the second-tier storage 208;

(b) pre-migrated: the current version of the data 204 has been copied to the second-tier storage 208, which means that there is a copy 210 of data 204 in the first-tier storage 202 and in the second-tier storage 208; and (c) migrated: the current version of the data 204 has been moved to the second-tier storage 208 and the metadata 220 of the data 204 includes a reference (a pointer) to the data 210 in the second-tier storage 208.

In general, data that have the ages and status "migrated" is not migrated for a second time as long as this status exists. Data and the status "pre-migrated" can be migrated exactly once, whereby the data content 222 is not actually transferred to the second-tier storage 208, but rather removed from the first-tier storage 202 (since it has been transferred before when it obtained the status "pre-migrated"). Data in the status "resident" have been migrated of our pre-migrated data.

The HSM server 212 generates a unique object ID for data 210 that has not yet been stored in the second-tier storage 208. For example: if data 204 of the first-tier storage 202 are sent to the HSM server 212 for the first time, it generates a unique object ID for these data. If the data 204 are sent to the HSM server 212 the second time because the original version of the data 204 has been changed by the host system 218, it does not generate a new object ID because the data 204 have already an object ID, as further explained below.

When the HSM client 206 migrates data 204 from the first-tier storage 202 to the second-tier storage 208, it sends the data 204, the data identifier—and when it exists, the object ID—to the HSM server 212. The HSM server 212 determines if the object ID has been sent by the HSM client 206; and if this is not the case, it generates a unique object ID and sends this unique object ID back to the HSM client 206. The HSM server 212 then stores the copy 210 of the data 204 on the second-tier storage 208 and updates its data structure 214 with the object ID, the data identifier and the storage location of the data 210. When the HSM client 206 obtains the unique object ID from the HSM server 212, it stores the unique object ID and the metadata 220 of the data 204 and removes the content 222 of the data 204 in the first-tier storage 202.

When the HSM client 206 pre-migrates data 204 from the first-tier storage 202 to the second-tier storage 208, it sends the data 204, the data identifier—and when it exists, the object ID—to the HSM server 212. The HSM server 212 generates the unique object ID, when required, and sends this back to the HSM client 206, and stores the data 210 on the stack and storage tier 208 and updates its data structure 214 with the object ID, the data identifier and the storage location of the data 210. When the HSM client 206 obtains the unique object ID from the HSM server 212, it stores the unique object ID in the metadata 212 of the data 204. The content 222 of the data 204 is not removed; this is the difference to a data migration: with pre-migration, the content of the data is available in the first-tier storage 202 and the second-tier storage 204.

The purpose of the unique object ID is that it is independent of the data identifier, which can be changed by the host system 218. The unit object identifier therefore provides a unique link between the data 204 on the first-tier storage 202 and the data 210 on the second-tier storage 208. If the data identifier has changed for the data 204 in the first-tier storage 202 (for example, a file is renamed), the object ID stored in the data 204 metadata 220 uniquely links the data 204 to the data on 210, because the HSM server 212 keeps track of the storage location for the object ID in its data structure 214.

The host system 218 can also repair from the first-tier storage 202 via the network 216. When the host system 218 reads data 204 that is migrated, the HSM client 206 intercepts this read request, determines the unique object ID, stored in the metadata 220 of the data 204, and sends a recall request to the HSM server 212 along with the object ID. The HSM server 212 uses its data structure 214 to determine the storage location of the data 210 in the second-tier storage 208 by matching the object ID, reads the data from the storage location and sends it to the HSM client via network 216. The HSM client 206 stores the data content 222 of the data 204 in the first-tier storage 202, changes the HSM status of the data 204 in the metadata 222 to "pre-migrated" and sends the data to the host system 218.

When the host system 218 reads data 204 that are pre-migrated, then these data can be read directly from the first-tier storage 202 because the data content 222 is available.

When the host system 218 creates new data 204 in the first-tier storage 202 (for example, a new file is created) that has not been stored before, then these new data 204 will not have the unique object ID in the metadata 220. However, the HSM client 206 intercepts the ending operation of the data storage process and sets the HSM status of the data 204 to "resident" in the metadata 220.

When the host system 218 updates data 204 in the first-tier storage 202 that already exists (for example, the content of the file is updated or data is truncated) and has the status "pre-migrated", the HSM client 206 intercepts the write operation and updates the metadata 224 of the data content 226 that will be updated with the HSM status of "resident".

The "resident" data can be updated on the host system. The previously created unique object ID to identify the data on the second-tier storage will become invalid due to the status change.

Any previous version of the data stored in the second-tier storage 208 is not available, since it might either have been overwritten or are orphaned.

When the host system 218 updates data 204 in the first-tier storage 202 that already exist (for example, the content of the file is updated) and has the status "migrated", then the HSM client 206 intercepts the write operation, determines the unique object ID stored in the metadata 220 of the data 204 in the first-tier storage and sends a recall request to the HSM server 212 along with the object ID. The HSM server uses its data structure 214 to determine the storage location of the data 210 in the second-tier storage 208 by matching the object ID, reads the data from the storage location, and sends it to the HSM client 206 via network 216. The HSM client stores the data content 222 of the data 204 in the first-tier storage 202, and changes the HSM status of the data 204 and the metadata 222 to "resident". The "resident" data can be updated on the host system 218. The previously created unique object ID to identify the data on the second-tier storage 208 will become invalid due to the state change.

Any previous version of the data is stored in the second-tier storage 208 and is not available since it might either have been overwritten or are orphaned.

In addition, FIG. 3 shows a block diagram 300 of the known data management application programmable interface (DMAPI). It provides file system kernel 302 functions to user space 304 applications. The DMAPI implementation is part of the file system kernel of the file system. The DMAPI applications 306, 308 are each a process that uses the API of the DMAPI routines 332. Typically, the DMAPI is used for hierarchical storage management applications (e.g., TSM for space management or HPS, both from IBM). Besides several other functionalities, the DMAPI allows to register (disposed) a DMAPI application and file system objects for so-called event messages 336. The event types that can be caught from a DMAPI application depend on the file system object type that is observed. The DMAPI implementation typically differentiates between a file system, a directory, metadata and data events that can be caught for file system types like file system mount points, directory, normal files or links. These events can be file system events like "mount", directory events like "attribute change" or data events like "read" on the file in the file system. Events are transferred between the DMAPI implementation and the DMAPI application via message queues called sessions. The event mechanism allows and the DMAPI application to interrupt the file system object activities or other use applications.

FIG. 3 illustrates the event handling that allows the DMAPI application 306, 308 to interrupt the user process 304 application that manipulates the file system object. Firstly, the user process 310 has initiated to write operation on the file, indicated by the arrow 312. The DMAPI implementation generates a synchronous write event after the kernel part 314 of the user process 334 initiated the write operation. The corresponding event message (note that two event messages are shown) is queued in the session that has the write disposition, arrow 316. The user process 310 is blocked now.

The DMAPI application 306 receives the event message, arrow 320. The DMAPI application A 306 requests exclusive rights for the given token, arrow 322. The DMAPI application B 308 requests rights for the same file, compare arrow 326. The DMAPI application 306 has finished its work and responds to the event with "continue", arrow 324. The corresponding token is invalid now. The DMAPI implementation unlocks the kernel part 314 of the user process 310, arrow 330. The write operation of the user process 310 continues. The user process 310 is now unblocked. The DMAPI application B 308 receives the exclusive rights for the file, arrow 328.

For a better understanding of the proposed method and system, it may also be useful to take a closer look at stub files. FIG. 4 shows a block diagram 400 of a comparison of a stub file 402 of a life file system (FIG. 4a) and a stub file 404 in a snapshot (FIG. 4b) with inode information 406, potentially available data 408, DMAPI system attributes 410 and DMAPI user attributes. It may be noted that FIG. 4 relates to a traditional implementation without the advantages of the here proposed method.

When the stub file 402 in the life system is deleted (4c), the stub file 404 (compare FIG. 4d) and a related snapshot (4b) will become an orphan if the actual real data would not be copied into the snapshot. Hence, the removal command for the stub file 402 (4a) has as an underlying process for recalling the file data and copying the data to the snapshot data area 408.

The DMAPI user attributes 412 of the stub file 404 and the snapshot are updated, so that the stub file is linked to the data and the snapshot data area. With the file data being available in the snapshot (4d), a stub file 404 in the snapshot can be accessed and can open the file data 408, even though no corresponding stub file 402 is available in the log file system.

Thus, the space used for a snapshot is increasing when stub files 402 are removed from the life file system (4a, 4c).

FIG. 5 shows a block diagram of the extended HSM system 500 in the context of the known HSM system from FIG. 2. As already mentioned above, the proposed effective HSM snapshot handling (EHSH) provides functions to eliminate the existing incompatibilities between HSM functions and file system snapshots. It solves the problem that HSM migrated files, that are deleted in the life file system and have a snapshot, must be recorded in the snapshot.

The EHSH system 500 enhances the snapshot manager module 502 to generate a hidden folder in the life file system on the first-tier storage 202 in case the first snapshot 504 is created. In a first step, the enhanced snapshot manager 502 is called with the name of the life file system on the first-tier storage 202 and a snapshot name of the first snapshot 544 that should be created. The enhanced snapshot manager 502 creates the snapshot 504 of the life file system that was provided as a parameter and creates a hidden folder in the life file system on the first-tier storage 202. A second snapshot 506 will not create a second hidden directory. Only one hidden directory for all subsequent snapshots is required.

If a migrated file 204 is removed from the life file system on the first-tier storage 202 where at least one snapshot 504 was created, the enhanced snapshot manager 502 is called with the name of the migrated file 204 to be removed and processes the following steps:

(1) The enhanced snapshot manager 502 reads the change time ("ctime") from the migrated file 204 to be removed.
(2) The enhanced snapshot manager 502 queries the list of existing snapshots 504, 506 and reads for each snapshot its creation time-stamp.
(3) The enhanced snapshot manager 502 matches the creation time stamp of each snapshot with a change time from the migrated file 204 in step (1) and creates a list of all snapshots 504, 506 that have been created after the migrated file 204 was changed the last time.
(4) The enhanced snapshot manager 502 moved the migrated file 204 in the hidden folder of the first-tier storage 202 created in step (1), as described above.
(5) The enhanced snapshot manager 502 adds one metadata attribute to the migrated file 204 moved into the hidden folder for each snapshot in the list collected in step (3). It may be noted that these metadata include information about all snapshots that hold a link to the original stub file.

At the same time, the migrated file 204 will be accessed later in the snapshot 504 or 506, the DMAPI user attributes provide the link to the corresponding migrated file 210 stored in the hidden folder and the life file system on the first-tier storage 202. Through this link, the migrated file 204 in the life file system under the hidden folder is accessed and the file data 210 stored in the second-tier storage 208 is recalled from the HSM server 212 to the life file system on the first-tier storage 202. The migrated files 204' and 204" in the snapshots 504, 506 are not able to initiate a recall of the data itself, because the DMAPI system attributes are not available in the migrated files 204' and 204". The DMAPI user attributes of the migrated files 204' and 204" in the snapshots 544, 506 provide the link to the data in the recalled file 204 stored in the hidden directory on the life file system. With the file data being available in the file 204 stored in the hidden directory, the migrated 204' or 204" in the snapshot can be accessed and can open the file data.

The proposed EHSH system 500 enhances the snapshot manager module 502 to remove the created metadata attribute from the file 204 that was stored in the hidden folder, as described above in the case a snapshot 504 or 506 is removed. The enhanced snapshot manager 502 performs the following steps if the snapshot 504 or 506 is removed:

(1) The enhanced snapshot manager 502 is called with a snapshot name of a snapshot 504 or 506 to be removed.
(2) The enhanced snapshot manager 502 removes the given snapshot 504 or 506. The enhanced snapshot manager 502 queries the hidden folder and lists all files in the hidden folder that have the metadata attribute with the name of the snapshot to be removed.
(3) The enhanced snapshot manager 502 removes the metadata attribute with a snapshot name from all files in the list be read in step (3).
(4) The enhanced snapshot manager 502 removes the file from the hidden folder if the last metadata attribute is removed from the file.

FIG. 6 shows a more condensed block diagram of the system 600 for handling snapshots together with migrated files in a hierarchical storage management. The system 600 comprises a first-tier storage 502 and a second-tier storage 504 adapted for managing files, wherein the files are organized in a managed file system—e.g., a hierarchically managed file system—in said first-tier storage, a snapshot unit 602 adapted for creating a snapshot of a portion of said files of said first-tier storage, and thereby creating a hidden directory in said file system, a deletion module 604 adapted for deleting a file in said first-tier storage, wherein said file is a migrated file, and a movement unit 606 adapted for moving the stub file relating to the file to be deleted in the first-tier storage to the hidden directory, as explained in more detail above.

Embodiments of the invention may be implemented together with virtually any type of computer, regardless of the platform being suitable for storing and/or executing program code. FIG. 7 shows, as an example, a computing system 700 suitable for executing program code related to the proposed method.

The computing system 700 is only one example of a suitable computer system and is not intended to suggest any limitation as to the scope of use or functionality of embodiments of the invention described herein, regardless, whether the computer system 700 is capable of being implemented and/or performing any of the functionality set forth hereinabove. In the computer system 700, there are components, which are operational with numerous other general purpose or special purpose computing system environments or configurations. Examples of well-known computing systems, environments, and/or configurations that may be suitable for use with computer system/server 700 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 700 may be described in the general context of computer system-executable instructions, such as program modules, being executed by a computer system 700. Generally, program modules may include routines, programs, objects, components, logic, data structures, and so on that perform particular tasks or implement particular abstract data types. Computer system/server 700 may be practiced in distributed cloud computing environments where tasks are performed by remote processing devices that are linked through a communications network. In a distributed cloud computing environment, program modules may be located in both, local and remote computer system storage media including memory storage devices.

As shown in the figure, computer system/server 700 is shown in the form of a general-purpose computing device. The components of computer system/server 700 may include, but are not limited to, one or more processors or processing units 702, a system memory 704, and a bus 706 that couple various system components including system memory 704 to the processor 702. Bus 706 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 700 typically includes a variety of computer system readable media. Such media may be any available media that is accessible by computer system/server 700, and it includes both, volatile and non-volatile media, removable and non-removable media.

The system memory 704 may include computer system readable media in the form of volatile memory, such as random access memory (RAM) 708 and/or cache memory 710. Computer system/server 700 may further include other removable/non-removable, volatile/non-volatile computer system storage media. By way of example only, a storage system 712 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 706 by one or more data media interfaces. As will be further depicted and described below, memory 704 may include at least one program product having a set (e.g., at least one) of program modules that are configured to carry out the functions of embodiments of the invention.

The program/utility, having a set (at least one) of program modules 716, may be stored in memory 704 by way of example, and not limiting, as well as an operating system, one or more application programs, other program modules, and program data. Each of the operating systems, one or more application programs, other program modules, and program data or some combination thereof, may include an implementation of a networking environment. Program modules 716 generally carry out the functions and/or methodologies of embodiments of the invention, as described herein.

The computer system/server 700 may also communicate with one or more external devices 718 such as a keyboard, a pointing device, a display 720, etc.; one or more devices that enable a user to interact with computer system/server 700; and/or any devices (e.g., network card, modem, etc.) that enable computer system/server 700 to communicate with one or more other computing devices. Such communication can occur via Input/Output (I/O) interfaces 714. Still yet, computer system/server 700 may communicate with one or more networks such as a local area network (LAN), a general wide area network (WAN), and/or a public network (e.g., the Internet) via network adapter 722. As depicted, network adapter 722 may communicate with the other components of computer system/server 700 via bus 706. It should be understood that although not shown, other hardware and/or software components could be used in conjunction with computer system/server 700. Examples, include, but are not limited to: microcode, device drivers, redundant processing units, external disk drive arrays, RAID systems, tape drives, and data archival storage systems, etc.

Additionally, the system 600 for handling snapshots together with migrated files in a hierarchical storage management is attached to the bus system 706.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another devices to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method for handling snapshots together with migrated files in a hierarchical storage management system, said method comprising:
   managing files using a first-tier storage and a second-tier storage, wherein said files are organized in a file system in said first-tier storage, wherein said file system is a managed file system;
   creating a snapshot of a portion of said files of said first-tier storage, and thereby creating a hidden directory in said file system;
   deleting a file, wherein said file is a migrated file, wherein the migrated file is copied from the first-tier storage to the second-tier storage; and
   moving a stub file relating to said file to be deleted in said first-tier storage to said hidden directory, wherein the stub file includes metadata attributes that provide a link to the migrated file located in the second-tier storage, wherein the link grants access to the migrated file.

2. The method according to claim 1, also comprising:
   determining a creation time of said migrated file to be deleted; and
   determining snapshot versions in which said migrated file to be deleted is part of.

3. The method according to claim 2, also comprising:
   adding metadata to said moved stub file in a hidden folder, said metadata being indicative of said determined snapshots.

4. The method according to claim 3, also comprising:
   deleting a snapshot by:
       determining stub files in said hidden directory, said stub files relating
       to said snapshot to be deleted;
       upon said snapshot not being said last one,
       deleting said related metadata; and
       deleting said snapshot.

5. The method according to claim 4, wherein said deleting a snapshot also comprises:
   upon said snapshot being said last one,
   deleting said related stub file in said hidden folder.

6. The method according to claim 1, wherein said creating said hidden directory is only performed for a first snapshot to be created.

7. The method according to claim 1, wherein said managed file system is an encrypted managed file system.

8. The method according to claim 1, wherein said managing said files is based on a data management application programming interface.

9. The method according to claim 1, wherein said snapshot is a software snapshot.

10. A system for handling snapshots together with migrated files in a hierarchical storage management, said system comprising:
    a first-tier storage and a second-tier storage adapted for managing files, wherein said files are organized in a file system in said first-tier storage, wherein said file system is a managed file system;
    a processing unit comprising:
        a snapshot unit creating a snapshot of a portion of said files of said first-tier storage, and thereby creating a hidden directory in said file system;
        a deletion module deleting a file in said first-tier storage, wherein said file is a migrated file, wherein the migrated file is copied from the first-tier storage to the second-tier storage; and
        a movement unit moving a stub file relating to said file to be deleted in said first-tier storage to said hidden directory, wherein the stub file includes metadata attributes that provide a link to the migrated file located in the second-tier storage, wherein the link grants access to the migrated file.

11. The system according to claim 10, also comprising:
a time determination unit adapted for determining a creation time of said migrated file to be deleted; and
a version determination unit adapted for determining snapshot versions in which said migrated file to be deleted is part of.

12. The system according to claim 11, wherein said snapshot unit is adapted for:
adding metadata to said moved stub file in a hidden folder, said metadata being indicative of said determined snapshots.

13. The system according to claim 12, also comprising:
a snapshot deletion unit adapted for deleting a snapshot by:
determining stub files in said hidden directory, said stub files relating
to said snapshot to be deleted;
upon said snapshot not being said last one;
deleting said related metadata; and
deleting said snapshot.

14. The system according to claim 13, wherein said snapshot deletion unit, when deleting a snapshot, is also adapted for:
upon said snapshot being said last one;
deleting said related stub file in said hidden folder.

15. The system according to claim 10, wherein said snapshot unit is also adapted for creating said hidden directory only for a first snapshot to be created.

16. The system according to claim 10, wherein said managed file system is an encrypted managed file system.

17. The system according to claim 10, wherein said managing said files is based on a data management application programming interface.

18. The system according to claim 10, wherein said snapshot is a software snapshot.

19. A computer program product for handling snapshots together with migrated files in a hierarchical storage management, said computer program product comprising a computer readable storage medium having program instructions embodied therewith, said program instructions being executable by one or more computing systems to cause said one or more computing systems to:
manage files using a first-tier storage and a second-tier storage, wherein said files are organized in a file system in said first-tier storage, wherein said file system is a managed file system;
creating a snapshot of a portion of said files of said first-tier storage, and thereby creating a hidden directory in said file system;
deleting a file in said first-tier storage, wherein said file is a migrated file, wherein the migrated file is copied from the first-tier storage to the second-tier storage; and
moving a stub file relating to said file to be deleted in said first-tier storage to said hidden directory, wherein the stub file includes metadata attributes that provide a link to the migrated file located in the second-tier storage, wherein the link grants access to the migrated file.

* * * * *